US012036598B2

(12) United States Patent
Hill et al.

(10) Patent No.: US 12,036,598 B2
(45) Date of Patent: Jul. 16, 2024

(54) METHOD AND SYSTEM FOR LUBRICATING AND FORMING A METAL COMPONENT FROM SHEET METAL

(71) Applicant: Ford Global Technologies, LLC, Dearborn, MI (US)

(72) Inventors: David John Hill, Ann Arbor, MI (US); S. George Luckey, Jr., Dearborn, MI (US); Mark Edward Nichols, Saline, MI (US); Rosa Lynda Nuno, Jerome, MI (US); Yun Bai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 17/712,612

(22) Filed: Apr. 4, 2022

(65) Prior Publication Data
US 2023/0311192 A1 Oct. 5, 2023

(51) Int. Cl.
*B21D 37/18* (2006.01)
*B21D 22/06* (2006.01)
*B21D 43/02* (2006.01)
*B21D 43/09* (2006.01)
*B21D 53/88* (2006.01)

(52) U.S. Cl.
CPC ............. *B21D 37/18* (2013.01); *B21D 22/06* (2013.01); *B21D 43/021* (2013.01); *B21D 43/09* (2013.01); *B21D 53/88* (2013.01)

(58) Field of Classification Search
CPC ........ B21D 22/02; B21D 22/06; B21D 37/18; G01L 1/24; B21J 1/06
See application file for complete search history.

(56) References Cited

U.S. PATENT DOCUMENTS

| 4,170,193 | A |   | 10/1979 | Scholes et al. |            |
|-----------|---|---|---------|----------------|------------|
| 4,724,155 | A |   | 2/1988  | Bray           |            |
| 4,905,556 | A | * | 3/1990  | Haack          | B21D 35/00 |
|           |   |   |         |                | 83/639.5   |
| 5,450,347 | A | * | 9/1995  | Thoms          | B21D 22/22 |
|           |   |   |         |                | 700/146    |
| 9,073,112 | B2| * | 7/2015  | Cole           | B21D 22/20 |

(Continued)

FOREIGN PATENT DOCUMENTS

CN 109795112 5/2019
DE 102011104520 12/2012

(Continued)

OTHER PUBLICATIONS

CN 109604408A, Gao et al. Apr. 2019.*

(Continued)

*Primary Examiner* — Edward T Tolan
(74) *Attorney, Agent, or Firm* — Burris Law, PLLC (57) ABSTRACT

A method of manufacturing a metal component includes performing a test stamping process on a test sheet metal blank, generating a strain map of the test sheet metal blank for the test stamping process, generating a lubrication program based on the strain map, applying lubrication to the sheet metal according to the lubrication program, and stamping the sheet metal to form the metal component. The lubrication program is configured to control a lubrication system to apply lubrication to sheet metal in a non-uniform distribution across the sheet metal. The non-uniform distribution correlates to the strain map.

17 Claims, 6 Drawing Sheets

(56) References Cited

U.S. PATENT DOCUMENTS

| | | | |
|---|---|---|---|
| 9,333,549 B2* | 5/2016 | Fujii | B21D 37/20 |
| 10,752,997 B2 | 8/2020 | Jiang et al. | |
| 11,148,436 B2* | 10/2021 | Schlatterbeck | B41J 2/515 |
| 11,590,591 B2* | 2/2023 | Fujii | G01N 3/24 |
| 2015/0082855 A1* | 3/2015 | Fujii | G06F 30/17 |
| | | | 72/379.2 |
| 2019/0358983 A1 | 11/2019 | Busbee et al. | |
| 2023/0105482 A1 | 4/2023 | Liu et al. | |

FOREIGN PATENT DOCUMENTS

| | | |
|---|---|---|
| DE | 102017009239 | 4/2019 |
| DE | 102019004713 | 2/2021 |

OTHER PUBLICATIONS

DE 102019004713A1, Gebauer Jan. 2021.*
WO 2013/157062A1, Shinmiya et al. Oct. 2013.*
DE 102017009239A1, Gebauer Apr. 2019.*
WO 2010/063866A1, Carino et al. Jun. 2010.*

* cited by examiner

METHOD AND SYSTEM FOR LUBRICATING AND FORMING A METAL COMPONENT FROM SHEET METAL

FIELD

The present disclosure relates to a method and system for lubricating and forming a metal component from sheet metal.

BACKGROUND

The statements in this section merely provide background information related to the present disclosure and may not constitute prior art.

Some mass-produced metal components, such as body panels of a vehicle for example, can start as a coil of sheet metal. The coil is typically unrolled in a continuous manner while being cut into discrete, flat sheet metal blanks. The sheet metal blank is typically a discrete, flat sheet having a predetermined length and shape. Each sheet metal blank is then coated with a uniform thickness of a lubricant before being moved to a stamping press line or being stacked for storage until ready to be moved to the stamping press line. The stamping press line typically includes one or more stamping presses configured to form the flat sheet metal blank into a three-dimensional metal component. Some stamping presses also remove small amounts of sheet metal during the stamping process.

The lubricant is typically applied to the sheet metal blank in a uniform thickness across the entire length and width of the sheet metal blank without regard to the stamping process. Furthermore, the lubricant application systems currently used typically result in excess lubrication consumption as well as overspray, which requires complicated and expensive capture and recycling technologies. Additionally, stacking sheet metal blanks that are fully and uniformly lubricated can result in the lubrication squeezing out from the edges. This squeezed out lubrication can cause the stacked sheet metal blanks to stick together, which can make it difficult for an individual sheet metal blank to be removed from the stack, such as with a robotic arm for example. Unintentionally loading two sheet metal blanks stuck together into the stamping press can damage the stamping press and shut down production. Furthermore, excess lubrication can make it more difficult to clean, pretreat, and paint the metal components after stamping.

The present disclosure addresses these and other issues associated with traditional sheet metal lubrication and stamping operations and devices.

SUMMARY

This section provides a general summary of the disclosure and is not a comprehensive disclosure of its full scope or all of its features.

According to one form in accordance with the teachings of the present disclosure, a method of manufacturing a metal component is provided. The method includes performing a test stamping process on a test sheet metal blank, generating a strain map of the test sheet metal blank for the test stamping process, generating a lubrication program based on the strain map, applying lubrication to the sheet metal according to the lubrication program, and stamping the sheet metal to form the metal component. The lubrication program is configured to control a lubrication system to apply lubrication to sheet metal in a non-uniform distribution across the sheet metal. The non-uniform distribution correlates to the strain map.

According to variations of this method, which may be employed individually or in any combination: the lubrication is applied by a print head including a plurality of print nozzles, each print nozzle being individually controlled by the lubrication program; the method further includes moving the sheet metal linearly while the print head applies the lubrication to the sheet metal; the lubrication program is configured to apply the lubrication according to a first thickness to a first region of the sheet metal and to apply the lubrication according to a second thickness to a second region of the sheet metal, the first thickness being thicker than the second thickness; the first region of the sheet metal correlates to a region of the strain map that has higher strain than a region of the strain map that correlates to the second region of the sheet metal; the print head is configured to apply pixels of lubrication to the sheet metal such that a size of each pixel of lubrication is 20 micrometers to 3,000 micrometers; the lubrication program is configured to: change spacing between the pixels, or change the size of the pixels, or change both the spacing between the pixels and the size of the pixels; the plurality of print nozzles includes a first subset of print nozzles and a second subset of print nozzles, wherein applying lubrication to the sheet metal includes applying a liquid lubricant to the sheet metal from the first subset of print nozzles and applying a dry-film lubricant to the sheet metal from the second subset of print nozzles; the lubrication program is configured to apply less lubrication proximate to edges of a sheet metal blank; applying the lubrication to the sheet metal according to the lubrication program includes applying a dry-film lubricant in a machine readable pattern; the method further includes scanning the metal component for defects and automatically adjusting the lubrication program based on defects detected; the test sheet metal blank is a computer model of a physical sheet metal blank and the test stamping process is a computer simulation of a stamping process, wherein the computer simulation generates the strain map; the test sheet metal blank is a physical piece of sheet metal and the test stamping process physically deforms the test sheet metal blank, wherein the method includes inspecting the test sheet metal blank after the test stamping process and the strain map is generated based on the inspection of the test sheet metal blank after the test stamping process; the method further includes operating a blanking machine on the sheet metal, the blanking machine removing material from a discrete length of the sheet metal to form a sheet metal blank; the lubrication is applied to the sheet metal according to the lubrication program before the blanking machine removes the material from the discrete length of the sheet metal to form the sheet metal blank; the lubrication is applied to the sheet metal according to the lubrication program after the blanking machine removes the material from the discrete length of the sheet metal to form the sheet metal blank.

According to another form in accordance with the teachings of the present disclosure, a method of manufacturing a metal component includes: performing a computer simulation of a stamping process to be performed on a sheet metal blank, the computer simulation calculating a strain map of the sheet metal blank for the stamping process; generating a lubrication program based on the strain map, the lubrication program being configured to control a print head to apply lubrication to sheet metal material so that the lubrication has a thickness that varies across the sheet metal material, the thickness being correlated to the strain map; applying lubrication to the sheet metal material according to the lubrication program; cutting the sheet metal material into a predetermined shape to define the sheet metal blank; and stamping the sheet metal blank to form the metal component.

According to variations of this method, which may be employed individually or in any combination: the lubrication program is configured to control the print head to apply a first thickness of lubrication to a first region of the sheet metal material and to apply a second thickness of lubrication to a second region of the sheet metal material, the first thickness being thicker than the second thickness, wherein the first region of the sheet metal material correlates to a region of the strain map that has higher strain than a region of the strain map that correlates to the second region of the sheet metal material; the print head includes a plurality of print nozzles, each print nozzle being individually controlled by the lubrication program, wherein the method includes moving the sheet metal material past the print head while the print head remains stationary and applies the lubrication to the sheet metal material according to the lubrication program.

According to another form in accordance with the teachings of the present disclosure, a system for lubricating sheet metal to be formed into a metal component is provided. The system includes a print head and at least one control module. The print head includes a plurality of lubricant nozzles. Each lubricant nozzle of the plurality of lubricant nozzles is individually controllable to selectively eject lubricant onto the sheet metal according to a lubrication program. The at least one control module is configured to generate the lubrication program based on a strain map. The strain map is an output of a computer simulation of a stamping process to be performed on the sheet metal. The at least one control module is configured to control operation of the print head to apply the lubricant to the sheet metal according to the lubrication program.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
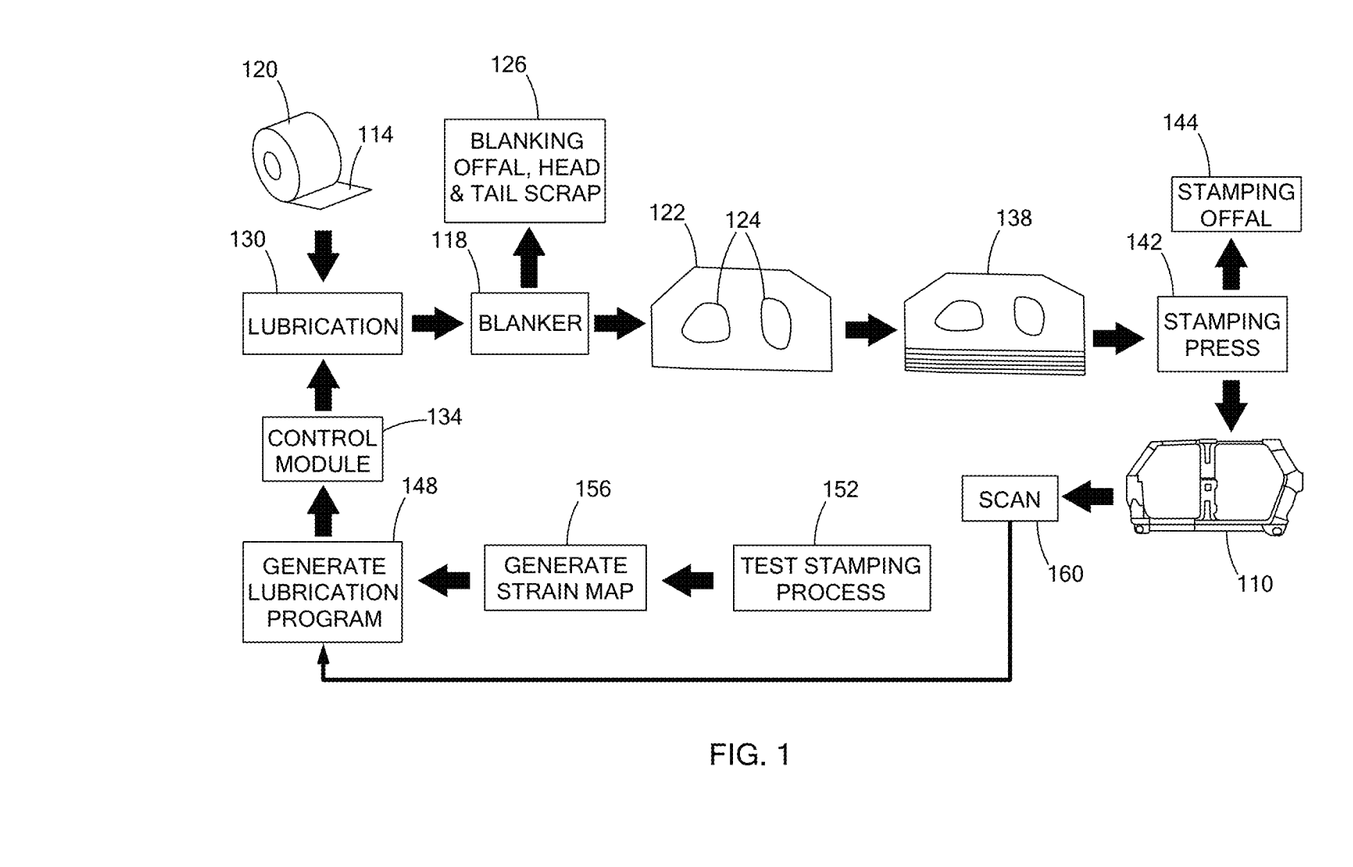
FIG. 1 is a schematic flow chart of a method of producing a metal component from sheet metal in accordance with the teachings of the present disclosure.

Referring to FIG. 1, a flow chart of a method and system of manufacturing a metal component 110 is illustrated. Sheet metal material 114 is fed through a lubrication system 130, such as by rollers (not specifically shown but may be similar to those shown in FIG. 2 for example).

In one form, the sheet metal material 114 can be unrolled from a coil 120 of metal. In one form, the sheet metal material 114 may be cut into predetermined discrete lengths from the coil 120 before being fed through the lubrication system 130 such that discrete, rectangular, flat sheets of metal are fed into the lubrication system 130. In another form, the lubrication system 130 acts on the continuous sheet of metal from the coil 120.

At the lubrication system 130, lubrication is applied to the sheet metal material 114. The application of the lubrication is controlled by a control module 134, as described in greater detail below. While described herein as "a" control module 134, it is to be understood that one or more control modules may be used.

Figure 2:
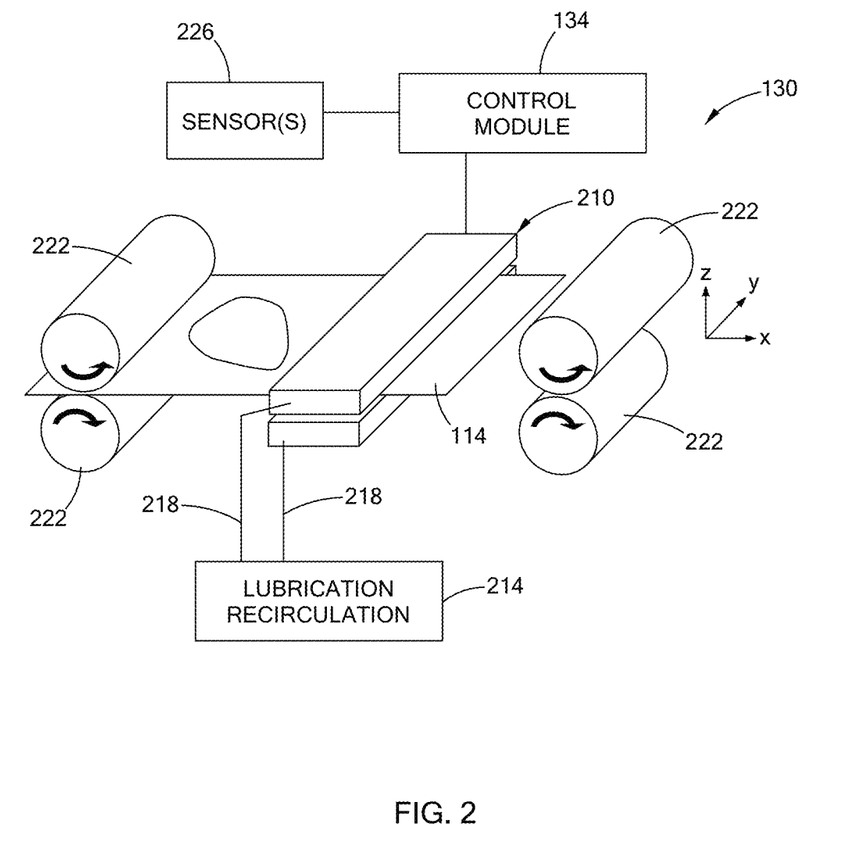
FIG. 2 is a schematic perspective view of a lubrication device in accordance with the teachings of the present disclosure.

After lubrication, the sheet metal material is fed into a blanker 118 or blanking machine, such as by rollers (not specifically shown but may be similar to those shown in FIG. 2 for example). The blanker 118 performs blanking operations to form a sheet metal blank 122. The sheet metal blank 122 is a predefined overall shape and can optionally include cut-outs 124. The blanking operation produces offal or scrap 126, such as metal material removed to define the shape and any cut-outs 124. The blanking operation can also sever the metal material from the coil 120 such that the sheet metal blank 122 is a discrete piece of metal material if not already severed before or after lubrication.

In the example provided, the sheet metal blank 122 is a flat sheet having a predefined shape. In an alternative configuration, not specifically shown, the sheet metal blank 122 may include minor or initial bends. In the specific example provided, the metal component 110 is a vehicle body or frame panel and the cut-outs 124 are rough openings that correspond to door and/or window openings in the final metal component 110, though other types of metal components can be manufactured.

While illustrated and described herein as lubricating the sheet metal material 114 before the blanking process of the blanker 118, in an alternative configuration, not specifically illustrated, the lubrication system 130 can be after the blanker 118 such that the lubrication is applied in a similar manner as that discussed below but to the sheet metal blank 122 after being processed by the blanker 118. In yet another configuration, not specifically illustrated, the lubrication system similar to lubrication system 130 can be included before and after the blanker 118 such that the lubrication applied before the blanker 118 can be specific to the blanking operation and the lubrication applied after the blanker 118 can be specific to the subsequent stamping operations.

With additional reference to FIG. 2, the lubrication system 130 includes the control module 134 and a print head 210. The print head 210 is in communication with the control module 134 and the control module 134 is configured to control operation of the print head 210, as described in detail below. The lubrication system 130 may also optionally include a lubrication capture and recirculation system 214 configured to catch and reuse or recycle excess lubrication. The lubrication capture and recirculation system 214 can be any suitable system and may include such devices as pumps (not specifically illustrated), recirculation conduits 218 and filters (not specifically illustrated) for example.

In the example provided, the print head 210 is stationary and the sheet metal material 114 is translated past the print head 210 while the print head 210 ejects lubrication onto the sheet metal material 114 as the sheet metal material 114 is moving past. For example, the sheet metal material 114 may be translated by rollers 222, though other configurations can be used. In the example provided, the print head 210 is located above the path of the sheet metal material 114 such that the print head 210 sprays lubricant on a top surface of the sheet metal material 114. In an alternative configuration, not specifically shown, the print head 210 can be positioned below the path of the sheet metal material 114 to spray lubricant on the bottom surface of the sheet metal material 114 or more than one print head may be used such that one sprays the top surface and another sprays the bottom surface.

One or more sensors 226 can be in communication with the control module 134 and configured to detect the sheet metal material 114, such as detecting its position in the X and/or Y direction relative to the print head 210 for example. The sensors 226 may also be configured to detect the width of the sheet metal material 114.

While the sheet metal material 114 is illustrated as translating horizontally, other orientations can be used. While pairs of rollers 222 are illustrated such that the sheet metal material 114 passes between two rollers 222 of each pair, other configurations can be used, e.g., rollers 222 only being located below the sheet metal material 114.

Returning to FIG. 1, after lubrication 130 and blanking 118, the lubricated sheet metal blank 122 may optionally be stacked with other lubricated sheet metal blanks to form a stack 138 of sheet metal blanks. The sheet metal blank 122 is then removed from the stack 138 and moved to a stamping press 142. In an alternative configuration, the sheet metal blank 122 can proceed directly to the stamping press 142 without being stacked.

In yet another alternative configuration, not specifically illustrated, the lubrication system 130 can be located after the stack 138 of sheet metal blanks and before the stamping press 142.

The stamping press 142 performs stamping operations on the sheet metal blank 122. These stamping operations can press the sheet metal blank 122 between dies (not specifically shown) that can shape the sheet metal blank 122 into three-dimensional shapes. The stamping operations may optionally remove additional offal or scrap 144. While one stamping press 142 is schematically illustrated, a plurality of stamping presses can be used to achieve the final three-dimensional shape of the metal component 110.

Figure 3:
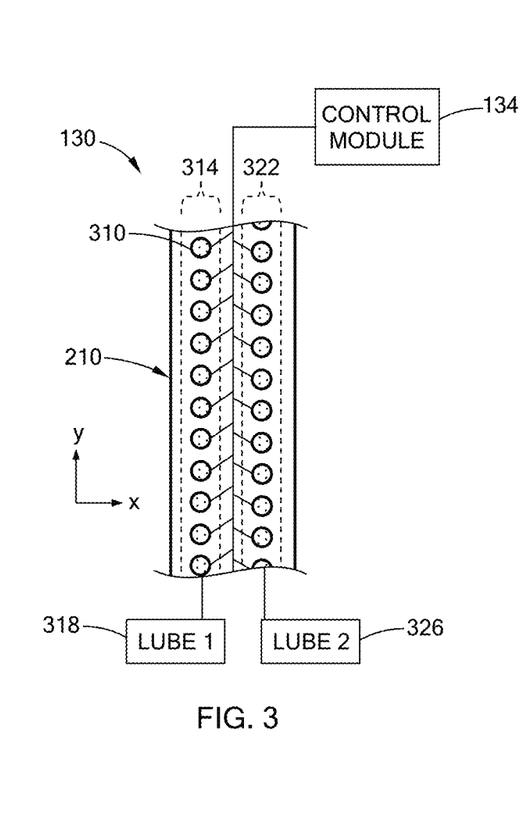
FIG. 3 is a schematic bottom view of a portion of a print head of the lubrication device of FIG. 2 in accordance with the teachings of the present disclosure.

Referring to FIG. 3, the print head 210 includes a plurality of nozzles 310. Each nozzle 310 is connected to the control module 134 for electrical communication therewith and is configured to be controlled independently of each other nozzle 310. As such, each nozzle 310 is individually addressable such that the control module 134 is configured to independently activate and deactivate each nozzle 310 according to a lubrication program, described in greater detail below.

The print head 210 includes a first set of nozzles (i.e., the nozzles 310 within dashed line region 314) connected to a lubrication source 318, which may include at least a reservoir (not specifically shown) and a pump (not specifically shown) for example. In the example provided, the first set of nozzles 314 may be arranged in an array along the Y-direction while the sheet metal material 114 (FIG. 2) is configured to translate in the X-direction relative to the print head 210, though other arrangements may be used. The print head 210 may optionally include a second set of nozzles 322 that can be arranged in a second array along the Y-direction, though other arrangements can be used. The print head 210 can be configured to span the entire width (i.e., in the Y-direction) of the sheet metal material 114 (FIG. 2).

In the example provided, the second set of nozzles 322 may be connected to a second lubrication source 326 that may optionally be separate from the first lubrication source 318. The first lubrication source 318 and the second lubrication source 326 can optionally supply different types of lubrication. In one form, the first lubrication source 318 provides a liquid lubricant and the second lubrication source 326 provides a solid lubricant such as a powder or dry-film wax for example. In an alternative configuration, not specifically shown, both the first set of nozzles 314 and the second set of nozzles 322 can be connected to the same lubrication source. While two arrays of nozzles 310 are illustrated, the nozzles 310 can be arranged in other configurations.

The nozzles 310 can be any suitable type of nozzle configured to be independently controlled and to print the lubrication with precision providing pixels of lubrication between 20 micrometers and 3,000 micrometers in size.

Figure 4:
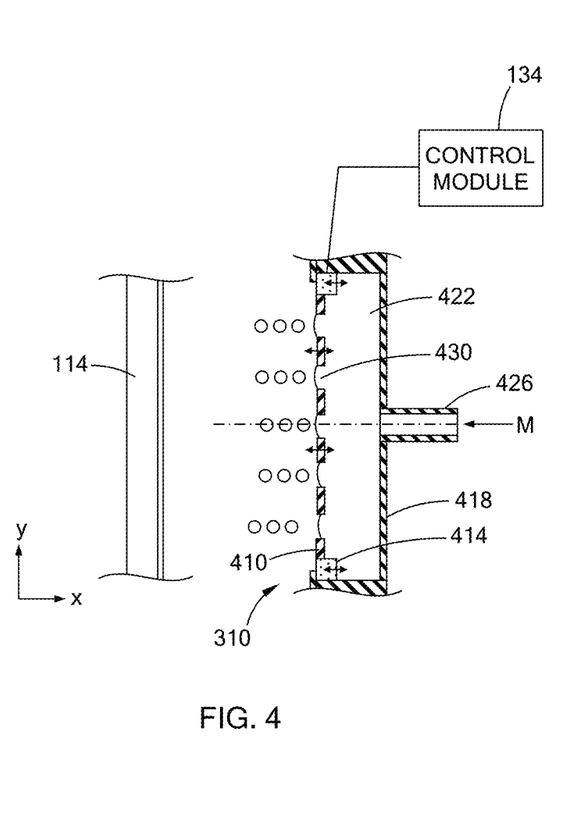
FIG. 4 is a schematic cross-sectional view of one example of a nozzle for use in the print head of FIG. 3.

With reference to FIG. 4, one example of a nozzle 310 is schematically illustrated. The example nozzle 310 of FIG. 4 is a piezoelectrically actuated nozzle, though other types of nozzles can be used. In some forms, this type of nozzle may be referred to as an ultrasonic atomizer. The example nozzle 310 includes an aperture plate 410, an actuator 414, and body 418. The body 418 and the aperture plate 410 cooperate to define a reservoir 422 configured to hold a volume of lubricant. The body 418 defines an inlet 426 open to the reservoir 422 and configured to supply lubricant material M to the reservoir 422. The aperture plate 410 defines one or more apertures 430. In the example provided, a plurality of apertures 430 are illustrated, but in an alternative form, a single aperture or more or fewer apertures than shown can be used. The actuator 414 is a piezoelectric actuator configured to vibrate the aperture plate 410. Vibration of the aperture plate 410 causes the lubricant to be ejected from the nozzle 310 through the apertures 430.

In some alternative forms, the actuator 414 may be attached to the body 418 separate from the aperture plate 410, such as within the reservoir 422 for example, and configured to produce acoustic pressure waves in the lubricant that is within the reservoir 422. The acoustic pressure waves can cause the lubricant to be ejected from the nozzle 310 through the apertures 430.

In still other forms, the nozzles 310 can be other types of printing nozzles known in the art. For example, the nozzles 310 can be piezoelectric jetting nozzles, thermal jetting nozzles, valve jetting nozzles or other ink jet nozzles that are capable of printing pixels of between 20 micrometers and 3,000 micrometers in size.

Figure 8:
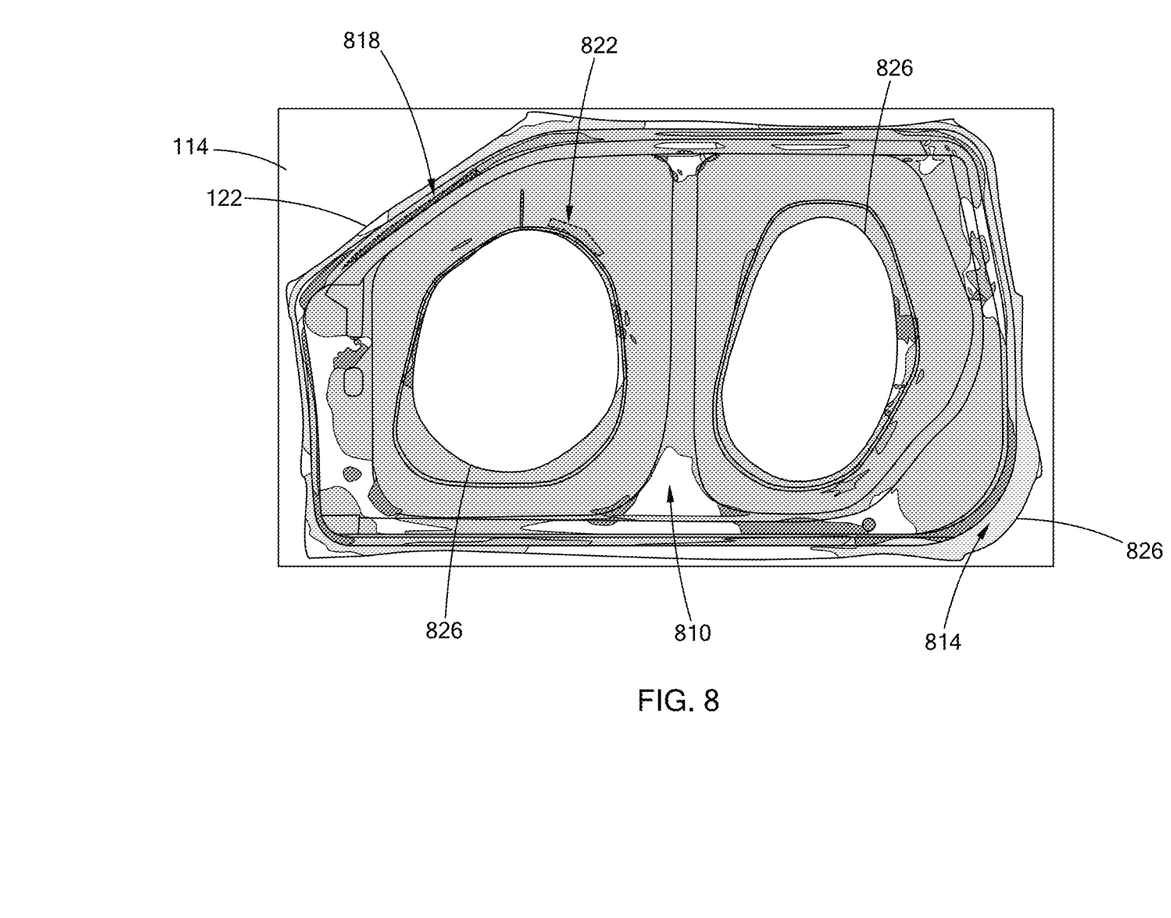
FIG. 8 is top view of a strain map of a metal component in accordance with the teachings of the present disclosure.

Returning to FIG. 1, the control module 134 is configured to control the operation of each nozzle 310 (FIG. 3) independently based on a lubrication program 148. In order to generate the lubrication program 148, a test stamping process 152 is performed on a test sheet metal blank. Based on the results of the test stamping process 152, a strain map 810 (FIG. 8) is generated at step 156. The lubrication program is generated 148 based on the strain map 810 (FIG. 8).

In one form, the test stamping process 152 is a simulated stamping process performed on a computer (not specifically shown) such that the test sheet metal blank is a computer model of the actual sheet metal blank 122. The test sheet metal blank is loaded in a computer program that performs a simulation (e.g., finite element analysis) of the stamping process on the test sheet metal blank (i.e., the computer model). The computer program generates a strain map from the simulation performed on the test sheet metal blank. The strain map 810 (FIG. 8) can include values indicative of strain at different locations along the test sheet metal blank. The strain map 810 may optionally also include other values such as coefficient of friction values, thickness values, locations of potential cracking, among other values.

A computer (e.g., the same computer or a different computer than the one that generated the strain map 810) can then generate the lubrication program based on the strain map 810. For example, the lubrication program can be configured to provide higher thicknesses of lubrication to locations where the strain map 810 indicates high levels of strain. Additionally, or alternatively, the lubrication program can be configured to provide higher levels of lubrication where the resulting material is thinner and/or where the simulation predicts cracking may occur.

In one form, the lubrication program can reduce or eliminate lubrication from being applied within a predetermined distance from the edges of the sheet metal blank 122 such that a border 814 (FIG. 8) of lower or no lubrication will result.

In an alternative form, the test sheet metal blank can be a physical sheet metal blank (similar to sheet metal blank 122) and the test stamping process 152 can include physically stamping the test sheet metal blank. The stamped test sheet metal blank can then be measured or scanned to generate the strain map 810. For example, the stamped test sheet metal blank can be physically measured with tools or scanned with three-dimensional scanners (not shown) such as laser scanners, radar scanners, optical scanners, or other suitable scanners. The measurements can indicate strain at different locations along the test sheet metal blank. For example, the measurements can measure changes in thickness, and/or locations where cracking occurred. The measured values, correlated to their locations on the test sheet metal blank, result in the strain map 810. The strain map 810 is then used to generate the lubrication program 148 in a manner similar to that described above with reference to the computer simulated test stamping process 152.

In one form, the test stamping process can optionally include test runs (e.g., actual physical tests or computer simulated test runs) of both the stamping process and the blanking process such that the strain map 810 is based on the operations of both the blanker 118 and the stamping press 142 and the lubrication program is based on both operations.

The control module 134 uses the lubrication program to control selective activation of the nozzles 310 to apply the lubrication to the actual sheet metal material 114 such that the lubrication is applied non-uniformly across the sheet metal material 114, in a manner that correlates to the strain map 810.

The metal component 110, after one or more stamping operations, can optionally be scanned 160 (e.g., optical scanners, laser scanners, etc.) and any defects can be used to modify the lubrication program to generate a new lubrication program 148 for the control module 134. In one form, the result of the scan 160 may be utilized by machine learning to automatically adjust the lubrication program.

Referring to FIG. 8, an example strain map 810 is illustrated for the sheet metal blank 122 of the example provided. In FIG. 8, the strain map 810 and sheet metal blank 122 is illustrated superimposed over a discrete length of the sheet metal material 114 for ease of understanding. In FIG. 8, different regions or levels of strain are indicated by different shading or colors. While FIG. 8 shows a visual representation of a strain map, the strain map may be merely a set of data correlating to the strain values and their corresponding locations (e.g., coordinates) on the sheet metal blank 122. It is understood that different applications will have sheet metal blanks of different sizes, shapes, and contours and that the strain map for different applications will be different.

In one form, the lubrication program can be configured to apply lubrication according to a first thickness to a first region 818 of the sheet metal material 114 and to apply the lubrication according to a second thickness to a second region 822 of the sheet metal material 114, the first thickness being thicker than the second thickness. In one form, the first region 818 of the sheet metal material 114 correlates to a region of the strain map 810 that has higher strain than a region of the strain map 810 that correlates to the second region 822 of the sheet metal material 114. Any number of regions having different strain levels, and consequently, different lubrication thicknesses or types can be used based on the resolution of the simulation or measurements and the resolution of the print head 210.

Figure 5:
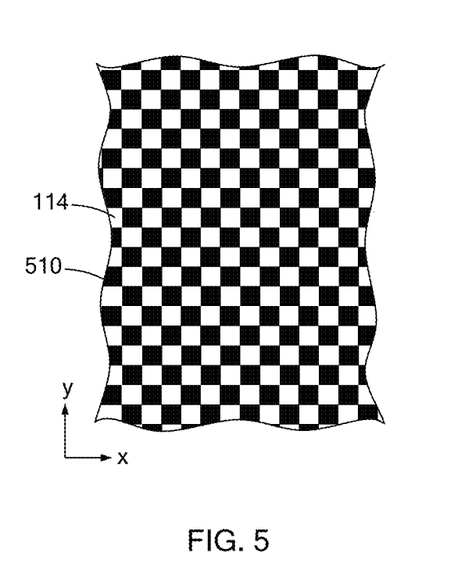
FIG. 5 is a schematic top view of an example of a pixel lubrication spray pattern from the print head of FIG. 3 in accordance with the teachings of the present disclosure.

Referring to FIG. 5, another feature of the lubrication system 130 (FIGS. 1 and 2) is that the control module can control precise application of the lubricant to produce pixels 510 of lubrication. In the example shown in FIG. 5, the lubrication is illustrated as the shaded squares and areas without lubrication are illustrated as blank squares. While square pixels are illustrated, other shapes can be used depending on the construction of the nozzles 310 (FIGS. 3 and 4), such as rounded pixels for example. As discussed above, the pixels are in the range of 20 micrometers to 3,000 micrometers in size.

In one form, illustrated in FIG. 5, the pixels can alternate between lubricated pixels 510 and non-lubricated pixels over a given area of the sheet metal material 114. In some applications, such a distribution of lubrication can provide adequate lubrication coverage while using less lubrication than uniformly coating the entire region.

In another form, the lubrication program can be configured to change the spacing between the pixels 510 and/or change the size of the pixels 510 (i.e., still within the range of 20 micrometers to 3,000 micrometers) across the sheet metal material 114 based on the strain map 810.

Figure 6:
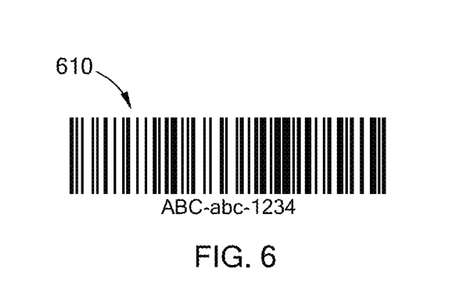
FIG. 6 is a top view of an example of a bar code lubrication spray pattern from the print head of FIG. 3 in accordance with the teachings of the present disclosure.
Figure 7:
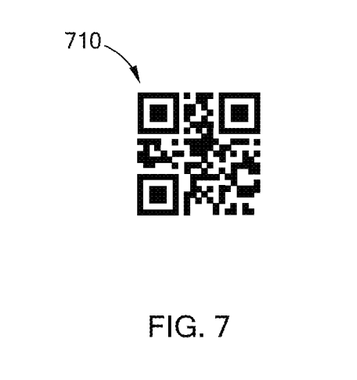
FIG. 7 is a top view of a second example of a bar code lubrication spray pattern from the print head of FIG. 3 in accordance with the teachings of the present disclosure.

In another form, illustrated in FIGS. 6 and 7, the precise pixelated control of the lubrication application can permit the lubrication to be applied to certain locations of the sheet metal material 114 in the form of a barcode 610 (FIG. 6) or 710 (FIG. 7). FIGS. 6 and 7 illustrate a linear barcode and a 2-D barcode (e.g., QR code), respectively, but other types of barcodes or scannable codes can be used. In one form, the lubrication can optionally be a material that fluoresces under a particular wavelength range (e.g., ultra-violet) and a scanner (not shown) utilizing that wavelength range can be used to scan the sheet metal material 114 (e.g., before or after stamping).

The barcode 610 or 710 can include any suitable information. In one form, the barcode 610 or 710 may include lot number and/or dates of the metal and/or of the lubrication, though other information can be used. For example, the information may be indicative of a vehicle part number and/or location of manufacture, among other information. While machine scannable barcodes are shown, other information may be printed in addition to or instead of a barcode, such as text or symbols readable by a person for example.

In the examples provided, the barcode 610 and 710 is applied with a dry-film lubricant, though other configurations can be used.

In another form, referring again to FIG. 8, the lubrication program can be configured to provide the border 814 of less lubrication (or no lubrication) within a predefined distance from edges 826 (e.g., the perimeter and/or edges defining cutouts) of the sheet metal blank 122. By providing less lubrication proximate the edges, stacked sheet metal blanks 122 can be easier to separate.

Additionally, the precise print head 210 and individual control of the nozzles 310 of the print head 210 permit different sizes and shapes of sheet metal material or blanks to be used with the same lubrication system 130 by merely changing the lubrication program.

Figure 9:
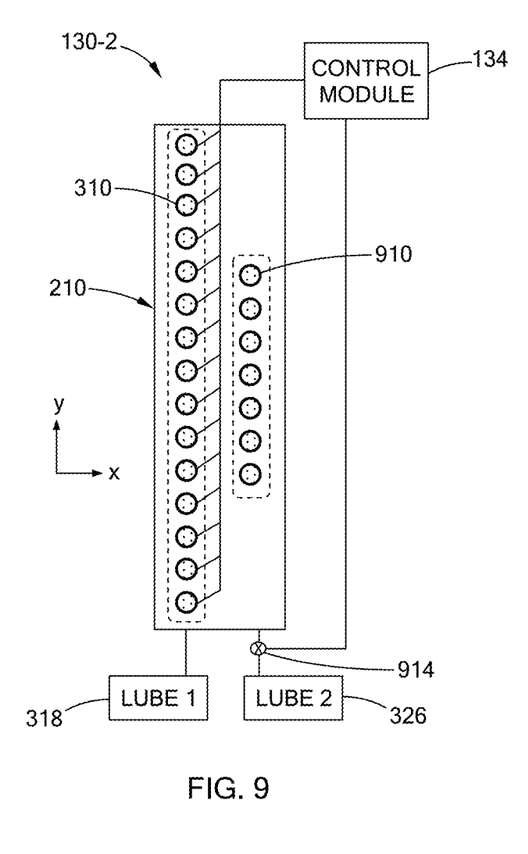
FIG. 9 is a schematic bottom view of a portion of a lubrication system of another configuration in accordance with the teachings of the present disclosure.

Referring to FIG. 9, a lubrication system 130-2 of a second construction is illustrated. The lubrication system 130-2 is similar to the lubrication system 130 (FIGS. 1-3) except as otherwise shown or described herein. Accordingly, similar features are indicated with similar numbers and only differences will be explained in detail. Specifically, the lubrication system 130-2 includes a plurality of nozzles 310 that are individually controllable and an array of nozzles 910 that are not individually controllable, but instead are all controlled together.

In the example provided, the nozzles 910 are arranged generally in the center of the path that the sheet metal material 114 will pass, though other configurations can be used. The nozzles 910 all provide lubrication at the same time in a uniform amount. The control module 134 can be in communication with a valve 914 between the lubricant supply 326 and the nozzles 910. When the valve 914 is open, the lubricant flows from all of the nozzles 910.

In the example provided, the lubricant supply 326 is separate from the lubricant supply 318, though other configurations can be used. In one form, the lubricant supplies 318, 326 provide the same type of lubricant. In an alternative form, the lubricant supplies 318, 326 provide different types of lubricant. In an alternative configuration some of the nozzles 910 may have more apertures or different sized apertures such that different amounts of lubricant can exit from each nozzle 910 despite all of the nozzles operating at the same time based on the condition of the valve 914.

The nozzles 910 can optionally be electrostatically charged to charge the lubrication leaving the nozzles 910 so as to be attracted to the sheet metal material 114. The individually controllable nozzles 310 are not electrostatically charged.

In the example provided, the individually controllable nozzles 310 are arranged in an array (similar to FIG. 3) across the entire width of the path of the sheet metal material 114. In an alternative configuration, shown in FIG. 10 and designated by reference numeral 130-3, the individually controllable nozzles 310 can be located only across the path of the sheet metal material 114 where the nozzles 910 are not configured to spray. For example, the nozzles 910 may be located to spray generally in the middle of the path while the nozzles 310 are only located proximate the edges of the path.

Figure 10:
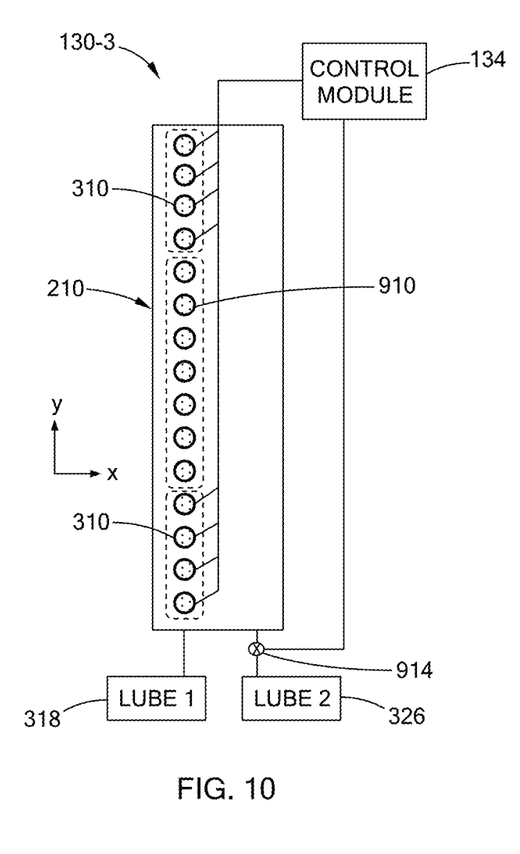
FIG. 10 is a schematic bottom view of a portion of a lubrication system of yet another configuration in accordance with the teachings of the present disclosure.

As a result, different numbers of the nozzles 310 can selectively be turned on or off to avoid overspray when the lubrication system 130-2 or 130-3 is used for different width sheet metal components. Thus, the lubrication system 130-2 or 130-3 may optionally provide lubrication for different widths of sheet metal and may provide the lubrication as a uniform or non-uniform distribution. Alternatively, the lubrication system 130-2 or 130-3 can provide reduced lubrication near the edges while providing either a uniform or non-uniform distribution across the middle. In the case of lubrication system 130-3, non-uniform distribution across the middle can be achieved with predetermined different numbers or sizes of apertures among the nozzles 910.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" and/or "control module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a metal component, the method comprising:
    performing a test stamping process on a test sheet metal blank;
    generating a strain map of the test sheet metal blank for the test stamping process;
    generating a lubrication program based on the strain map, the lubrication program being configured to control a lubrication system to apply lubrication to sheet metal in a non-uniform distribution across the sheet metal, the non-uniform distribution correlating to the strain map;
    applying lubrication to the sheet metal according to the lubrication program; and
    stamping the sheet metal to form the metal component,
    wherein the lubrication program is configured to apply the lubrication according to a first thickness to a first region of the sheet metal and to apply the lubrication according to a second thickness to a second region of the sheet metal, the first thickness being thicker than the second thickness.

2. The method according to claim 1, wherein the lubrication is applied by a print head including a plurality of print nozzles, each print nozzle being individually controlled by the lubrication program.

3. The method according to claim 2 further comprising moving the sheet metal linearly while the print head applies the lubrication to the sheet metal.

4. The method according to claim 1, wherein the first region of the sheet metal correlates to a region of the strain map that has higher strain than a region of the strain map that correlates to the second region of the sheet metal.

5. The method according to claim 2, wherein the print head is configured to apply pixels of lubrication to the sheet metal such that a size of each pixel of lubrication is 20 micrometers to 3,000 micrometers.

6. The method according to claim 5, wherein the lubrication program is configured to: change spacing between the pixels, or change the size of the pixels, or change both the spacing between the pixels and the size of the pixels.

7. The method according to claim 2, wherein the plurality of print nozzles includes a first subset of print nozzles and a second subset of print nozzles, wherein applying lubrication to the sheet metal includes applying a liquid lubricant to the sheet metal from the first subset of print nozzles and applying a dry-film lubricant to the sheet metal from the second subset of print nozzles.

8. The method according to claim 2, wherein the lubrication program is configured to apply less lubrication proximate to edges of a sheet metal blank.

9. The method according to claim 2, wherein applying the lubrication to the sheet metal according to the lubrication program includes applying a dry-film lubricant in a machine readable pattern.

10. The method according to claim 1 further comprising:
    scanning the metal component for defects; and
    automatically adjusting the lubrication program based on defects detected.

11. The method according to claim 1, wherein the test sheet metal blank is a computer model of a physical sheet metal blank and the test stamping process is a computer simulation of a stamping process, wherein the computer simulation generates the strain map.

12. The method according to claim 1, wherein the test sheet metal blank is a physical piece of sheet metal and the test stamping process physically deforms the test sheet metal blank, wherein the method includes inspecting the test sheet metal blank after the test stamping process and the strain map is generated based on the inspection of the test sheet metal blank after the test stamping process.

13. The method according to claim 1 further comprising operating a blanking machine on the sheet metal, the blanking machine removing material from a discrete length of the sheet metal to form a sheet metal blank.

14. The method according to claim 13, wherein the lubrication is applied to the sheet metal according to the lubrication program before the blanking machine removes the material from the discrete length of the sheet metal to form the sheet metal blank.

15. The method according to claim 13, wherein the lubrication is applied to the sheet metal according to the lubrication program after the blanking machine removes the material from the discrete length of the sheet metal to form the sheet metal blank.

16. A method of manufacturing a metal component, the method comprising:
    performing a computer simulation of a stamping process to be performed on a sheet metal blank, the computer simulation calculating a strain map of the sheet metal blank for the stamping process;
    generating a lubrication program based on the strain map, the lubrication program being configured to control a print head to apply lubrication to sheet metal material so that the lubrication has a thickness that varies across the sheet metal material, the thickness being correlated to the strain map;
    applying lubrication to the sheet metal material according to the lubrication program;
    cutting the sheet metal material into a predetermined shape to define the sheet metal blank; and
    stamping the sheet metal blank to form the metal component,
    wherein the lubrication program is configured to control the print head to apply a first thickness of lubrication to a first region of the sheet metal material and to apply a second thickness of lubrication to a second region of the sheet metal material, the first thickness being thicker than the second thickness, wherein the first region of the sheet metal material correlates to a region of the strain map that has higher strain than a region of the strain map that correlates to the second region of the sheet metal material.

17. The method according to claim 16, wherein the print head includes a plurality of print nozzles, each print nozzle being individually controlled by the lubrication program, wherein the method includes moving the sheet metal material past the print head while the print head remains stationary and applies the lubrication to the sheet metal material according to the lubrication program.

* * * * *